United States Patent Office 3,517,972
Patented June 30, 1970

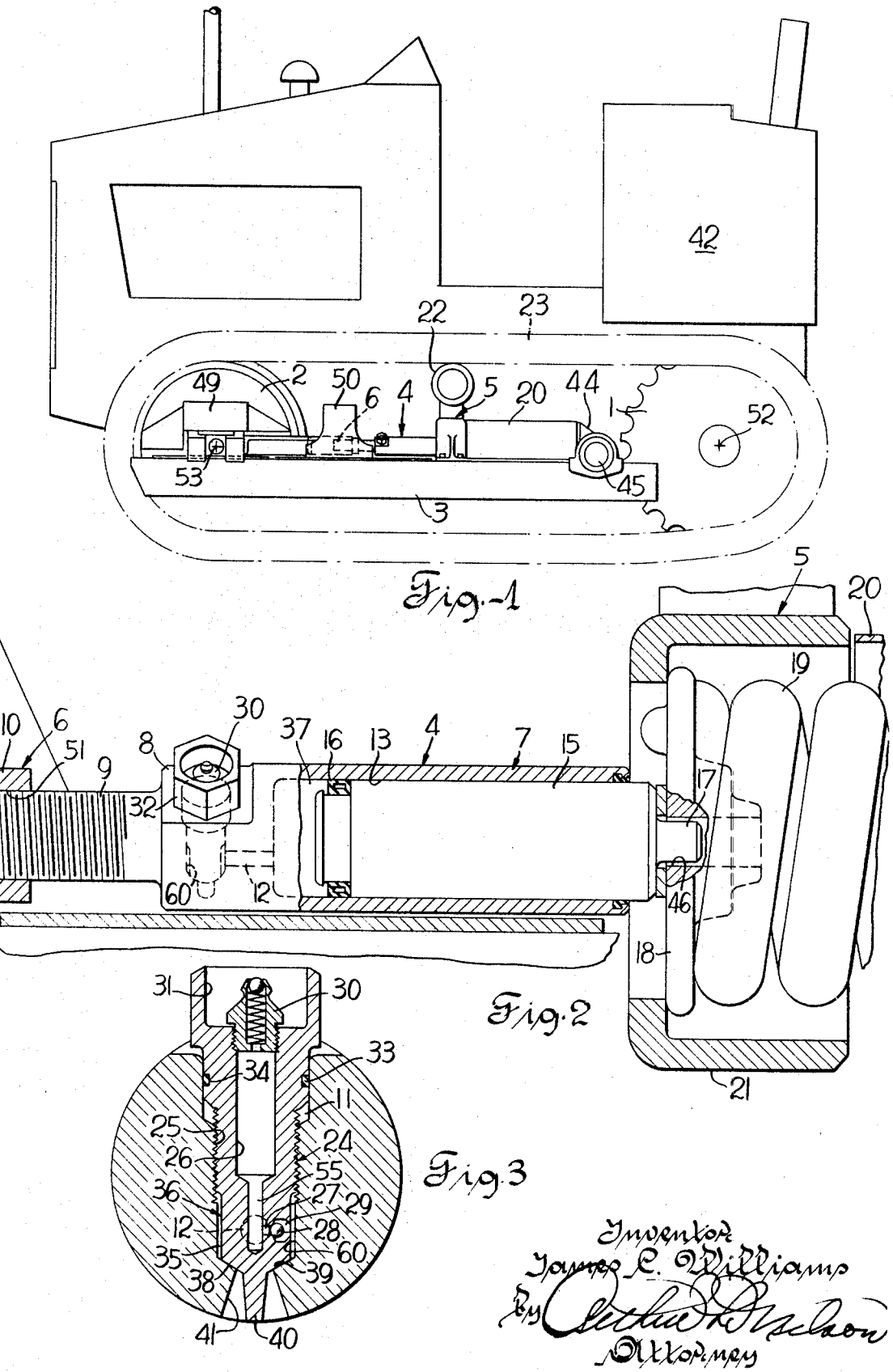

3,517,972
HYDRAULIC TRACK ADJUSTER
James Curtis Williams, Milwaukee, Wis., assignor to Allis-Chalmers Manufacturing Company, Milwaukee, Wis.
Filed May 31, 1968, Ser. No. 733,715
Int. Cl. B62d 55/30
U.S. Cl. 305—10
10 Claims

ABSTRACT OF THE DISCLOSURE

A hydraulic track adjuster for taking up the slack and providing the proper tension on the endless track for a crawler tractor.

---

This invention relates to a vehicle having endless tracks for traction means and more specifically refers to a hydraulic track tensioning device for adjusting the tension on the endless track.

The undercarriage of a crawler tractor employs two endless tracks to carry the vehicle and provide traction for the movement of the vehicle. Various devices have been employed for tensioning of the track which also operate as recoil mechanisms to absorb shock on the track when foreign material wedges between the sprockets and the endless track. The recoil mechanism also limits strain on the track when an obstacle is encountered by the track and added tension is placed on the track. Various mechanical means have been utilized to provide the proper tension, however, these devices usually are cumbersome, difficult to manually adjust. Accordingly, the hydraulic type of track tensioning device is more desirable. The hydraulic tensioning device usually includes a hydraulic cylinder and piston which are expandable relative to each other to increase the linear dimension between the axial centers of the drive and the driven sprocket carrying the endless track. Although in some respects, these devices are satisfactory, care must be used when the fluid is forced into the hydraulic cylinder under high pressure to expand the piston relative to the cylinder.

Under certain conditions it is desirable to release fluid from the cylinder to reduce the tension on the track. A disadvantage of the conventional track tensioning means in releasing fluid has been in the erratic operation creating a safety hazard.

One of the methods previously used was to provide a cap screw with sealing means under its head to prevent the escape of the grease. A threaded portion of the cap screw was provided with an axial groove or slot terminating midway up to the threads. When the cap screw is backed out of its threaded opening, the slot is exposed permitting grease to escape from the cylinder. This method was unreliable and dangerous due to the possibility of foreign matter blocking escape of the grease until the length of the slot exposed exceeds safe limits. When the foreign material did work loose, grease would burst out sometimes toward the operator under tremendous pressure.

Another method was to provide a ball check valve held in place by a set screw. With this method the ball could lock in its closed or seated position and when the set screw is turned out to release the pressurized grease no result was obtained. This increased the possibility of the operator backing the set screw all the way out and if the ball then loosens it would shoot out like a bullet.

This invention provides a new and improved method of releasing presusrized grease from hydraulic tensioning device which included the inherent advantages of a positive mechanical seal and releasing the pressurized grease 180° from a lubrication fitting away from the operator rather than toward him. The valve is constructed in such a manner that a tapered end on the valve screw leaves an opening to the exterior of the cylinder when the valve is backed out thereby assuring an open passage for the grease even if foreign material is packed or frozen in the port. With this structure there is no danger of plugging which might cause the operator to turn the valve all the way out and present a danger of the pressurized grease exploding in the direction of the operation. A ball check valve is also utilized to prevent excessive back pressure on the lubricating fitting which is used for admitting pressurized grease for expanding the cylinder from its piston.

It is an object of this invention to provide a hydraulic device for slack take-up and tensioning of an endless track on a crawler tractor.

It is another object of this invention to provide a hydraulic cylinder for controlling the track tensioning utilizing a fitting for admitting fluid and a manually operable valve which when retracted withdraws from a tapered passage for release of grease.

It is a further object of this invention to provide a hydraulic fitting for admission of grease to a hydraulic track adjusting cylinder and a manually operable valve defining a cone shaped valve seat and passage which forms a positive opening when the tapered valve element is withdrawn from its closed position.

The objects of this invention are accomplished by utilizing a hydraulic piston and cylinder operating as a hydraulic jack for use in adjusting the tension of a vehicle endless track. A grease fitting is used to admit pressurized grease in the high pressure chamber defined by the cylinder and piston which expands these elements relative to each other. The one element is mounted on the vehicle frame while the second causes an idler sprocket to expand relative to the driving sprocket which in turn will increase the linear dimension between axial centers of the sprockets. The force is transmitted through a spring which is compressed to maintain tension on the endless track when in its adjusted position.

Another feature in this invention is the use of a grease fitting for admitting high pressure grease into the cylinder cavity and adapting a check valve to prevent the shock of high pressure created by the thrust on the endless track when the vehicle is in operation. The fitting will never be subjected to a higher pressure than the pressure used in forcing grease into the cylinder cavities.

A conical shaped valve seat engages a mating valve element having an extending conical shaped portion which forms a passage for the discharge of high pressure grease from the cylinder cavity thereby permitting the tensioning device to contract and reduce the tension of the endless track.

A preferred embodiment of this invention will be described in the following paragraphs and illustrated in the attached drawings in which:

FIG. 1 illustrates a side elevation view of a vehicle having an endless track utilizing a track tension adjusting device;

FIG. 2 illustrates an enlarged cross section view of a track tensioning device; and FIG. 3 illustrates a fragmentary cross section view of the fitting and valve used with the track tensioning device.

The hydraulic track tensioning device includes a hydraulic cylinder having a piston therein and a grease fitting adjacent the closed end of the cylinder through which the grease is admitted into the cylinder to move the piston. This movement of the piston is directed against the movable idler sprocket for adjusting the tension on a track. The pressurized grease in the cylinder serves to maintain the piston in its extended or adjusted position.

Referring to FIG. 1, the present invention is shown on a track laying vehicle with a track on each side of the vehicle. The drive sprocket is shown on the rear of the vehicle and the track tensioning device is positioned intermediate the drive sprocket 1 and the idler 2. The idler is mounted on an axle journaled at each end in the idler bearing boxes which are slidably mounted on the track frame 3. The tensioning device 4 includes a piston and cylinder assembly generally connected to the spring unit 5. The opposite end of the tensioning device engages a yoke 6. The terminals of the yoke 6 are in turn secured in a suitable manner to the idler bearing boxes.

The tensioning device 4 includes the cylinder 7 one end of which is open and a closed end 8 which is adjustably secured by a threaded end 9 to the yoke sleeve 10. The closed end 8 of the cylinder 7 is provided with a vertical valve opening 11 to the cylinder bore. The vertical valve opening 11 is in communication with the horizontal passage 12 leading to the cylinder bore 13. The tensioning device 4 also includes a piston rod 15 the inner end of which is received in cylinder bore 13 and provided with a ring seal 16. The outer free end of the piston 15 is provided with a knob 17 adapted to be received in the complementary opening of the spring block 18 which forms part of the spring unit 5. Affixed to the spring block 18 is a heavy compression spring 19, the spring block and a spring being located between the piston 15 and abutment 44 which is pivotally connected to the frame 3. The forward end of the spring housing 20 is adjacent the casting 21 which in turn supports the rollers 22 engaging inner portion of the endless track 23.

A valve generally indicated by the number 24 is received within the opening 11 in the closed end 8 of the cylinder 7 with said valve being threaded into the center tap portion 25 of the opening 11. The valve 24 is also provided with an axial passage 26 communicating with a side opening 27 in which a ball 28 is loosely held within the opening 29. A grease fitting 30 of conventional construction is detachably mounted in the upper end of the passage 26. This fitting being received within a well 31 formed in the hexagon external head portion 32 on the valve 24. This arrangement provides a cylindrical guard for the grease fitting 30 to prevent damage thereto by rocks or any foreign material. A ball 28 operates as a check valve to prevent the grease fitting 30 from being blown out under excessive pressure in chamber 37 caused by shock forces transmitted to the assembly of a cylinder 7 and the piston 15. The ball 28 unseats when grease passing through openings 27 and 29 enters the chamber 37. Back pressure caused by the external forces acting on the tensioning device 4 will move the ball 28 in sealing relationship with respect to the restricted passage 27 thereby protecting the grease fitting against pressures in excess of normal cylinder pressures.

The peripheral portion of the valve 24 is provided with an O-ring seal 33 received in the valve groove 34. The portion 35 of the valve element 36 is somewhat smaller in diameter than the surrounding opening 60 thereby providing a circumferential passage for lubricant passing around the ball check 28 and subsequently through the horizontal opening 12 to the cylinder chamber 37.

The portion 40 of the valve element 36 has a conical surface 38 which contacts the mating surface 39 formed in the opening 11 to prevent emission of pressurized grease from the valve when closed. The valve element 24 is firmly seated on the valve seat 39 by use of a wrench on the hexagonal head 32 on the upper end of the valve element 24. The valve element 24 may also be backed out from the opening 11 and away from the valve seat 39 to permit pressurized grease to be emitted from the pressurized chamber 37 through the flared passage 41.

A tapered portion 40 extends from the conical surface 38 of a valve element 36 and is received within a reduced diameter passage 41 in the valve opening 11. When the valve element 24 is withdrawn from the opening it can be seen that a passage is formed by the tapered portion 40 to permit emission of pressurized grease through the passage 41.

Operation of the tensioning device will be described in the following paragraphs.

The vehicle 42 is carried on a pair of endless tracks 23 which are tensioned by the tensioning device 4. The tensioning device 4 operates to create a compression force on the spring 19 which is held within the spring housing 20 and compressed between the abutment 44 which is pivotally connected by the pin 45 to the frame 3. The opposite end of the compression spring 19 is seated against the spring block 18 which defines a socket 46 for receiving knob 17 on the piston 15. The knob 17 forms the end of the piston 15 which is received within the cylinder 7. The cylinder 7 has a closed end 8 containing the valve 24 which includes the fitting 30. The closed end 8 of the cylinder 7 also has a threaded stem portion 9 which threadedly engages the yoke sleeve 10 which in turn is connected to the journal boxes 49 slidably mounted on the frame 3. The idler is carried by the journal boxes 49 and is slidable relative to the drive sprocket 1 in response to operation of the tensioning device 4. A casting 50 retains the closed end 8 of the cylinder 7 and the threaded portion 51 of the sleeve 10 in axial slidable position as shown. The extending of the tensioning device 4 causes a greater axial dimension between the center line 52 of the drive sprocket 1 and the center line 53 of the idler 2.

When it is desired to increase the tension on the track 23 pressurized grease is injected into the grease fitting 30 to the passageways 55, 27 and 12 into the pressurized chamber 37 defined by the cylinder 7 and a piston 15. The force of the pressurized grease in the pressurized chamber 37 forces the piston 15 to move axially relative to the cylinder 7 thereby producing a force on the spring block 18 and compressing the spring 19. The spring 19 in turn forces against the abutment 44 and the pivoting pin 45 on the frame 3. The closed end of the cylinder 8 forces the yoke 6 connected to the bearing boxes 49 of the idler 2 to move forwardly relative to the sprocket 1. This in turn tightens the track. When the desired degree of tension is produced in the track 23 the grease is retained by the fitting 30 and the ball 28 which seats on the opening 27. The check valve formed by the ball 28 in the passage 27 is an added refinement of the invention.

When it is desired to loosen the track for improved operation on some types of terrain such as sand, the grease may be removed from the pressurized chamber 37 in the cylinder 7. The valve element 24 is backed out of the opening 11 by turning the hex head valve element 24 outwardly. This causes the conical valve surface 38 to unseat from its mating valve seat 39. Simultaneously an opening between the conical valve element 40 and the opening 41 is formed. This movement of the valve element 24 produces an unobstructed opening from the passage 60 which in turn is connected through the passage 12 to the pressurized chamber 37. It is noted that the grease egresses 180° from the point of the valve operation which the operator must rotate to permit the grease to flow from the pressurized chamber 37.

The valve provides a positive operation for admitting grease to tension the track. The seal of the valve is positive and foolproof. It also operates safely when fluid is withdrawn from the pressurized chamber 37 for reducing the tension on tracks 23.

The preferred embodiment of this invention has been illustrated and described and will be defined in the attached claims.

The embodiments of the invention in which an exclusive property or privilege is claimed are defined as follows:

1. In a vehicle having an endless drive track running on a drive sprocket having support means and at least one idler having support means, a track tensioning device comprising, a resilient member, a hydraulic actuator defining an expansible fluid chamber for axially expanding with said resilient member and increasing the dimension between the support means for said idler and said sprocket, an inlet valve and inlet passage means connected to said fluid chamber in said hydraulic actuator for transmitting pressurized fluid into said fluid chamber to expand said hydraulic actuator, means defining outlet passage means connected to said fluid chamber and to the atmosphere, a discharge valve including a valve seat defined by said outlet passage means, a valve element engaging said valve seat and extending through the length of the said outlet passage means and moving through a withdrawing movement from said outlet passage means when said discharge valve is opened to thereby form an opening for fluid discharge.

2. A tensioning device as set forth in claim 1 wherein said inlet valve and inlet passage means includes a fitting admitting pressurized fluid to said fluid chamber for tensioning of said track, and a check valve in said inlet passage means intermediate said inlet valve and said fluid chamber limiting the peak pressure on said fitting to the pressure of fluid when injected into said fluid chamber.

3. A tension device as set forth in claim 1 wherein said hydraulic actuator defines a diametrical passage, said discharge valve element defines a manually operable portion and a discharge portion extending diametrically through said diametrical passage for discharge of fluid on the opposite side of said tension device from the manually operable portion.

4. A tensioning device as set forth in claim 1 wherein said hydraulic actuator defines a threaded opening threadedly receiving a manually operable portion of said discharge valve element to thereby adjustably control communication between the fluid chamber and the discharge passage.

5. A tensioning device as set forth in claim 1 wherein said valve element includes a tapered extending portion extending through the external portion of said outlet passage means to form the opening in communication with said fluid chamber when said valve element is withdrawn from its mating valve seat as the discharge valve is opened.

6. A tensioning device as set forth in claim 1 wherein said valve element defines a tapered portion on its external end.

7. A tensioning device as set forth in claim wherein said discharge passage defines a flared portion externally of said valve seat.

8. A tension device as set forth in claim 1 wherein a cylinder and a piston define the expansible fluid chamber for increasing the dimension between the support means of said drive sprocket and said idler thereby tensioning of the endless track.

9. A tensioning device as set forth in claim 8 wherein said discharge valve element coaxially receives said inlet valve.

10. A tensioning device as set forth in claim 9 wherein said hydraulic actuator defines an opening for receiving a manually operable portion of said discharge valve, said outlet passage means communicates with said opening and extends away from said opening for discharge of fluid away from the operable portion of said valve element.

References Cited

UNITED STATES PATENTS

| | | | |
|---|---|---|---|
| 2,828,170 | 3/1958 | Badgley | 305—10 X |
| 2,959,451 | 11/1960 | Weber | 305—10 |
| 3,463,559 | 8/1969 | Gehrke | 305—10 |

FOREIGN PATENTS

| | | | |
|---|---|---|---|
| 1,086,008 | 10/1967 | Great Britain. | |

RICHARD J. JOHNSON, Primary Examiner

PO-1050
(5/69)

UNITED STATES PATENT OFFICE
CERTIFICATE OF CORRECTION

Patent No. 3,517,972          Dated June 30, 1970

Inventor(s) James C. Williams

It is certified that error appears in the above-identified patent and that said Letters Patent are hereby corrected as shown below:

Column 5, claim 3, line 1, cancel "tension" and substitute --- tensioning ---;
    Column 5, claim 3, line 6, cancel "tension" and substitute --- tensioning ---;
    Column 6, claim 7, line 1, after "claim" insert --- 1 ---;
    Column 6, claim 8, line 1, cancel "tension" and substitute --- tensioning ---.

SIGNED AND
SEALED
OCT 13 1970

(SEAL)
Attest:

Edward M. Fletcher, Jr.
Attesting Officer

WILLIAM E. SCHUYLER, JR.
Commissioner of Patents